United States Patent [19]
Johnston

[11] Patent Number: 6,064,649
[45] Date of Patent: *May 16, 2000

[54] NETWORK INTERFACE CARD FOR WIRELESS ASYNCHRONOUS TRANSFER MODE NETWORKS

[75] Inventor: Cesar A. Johnston, Franklin Park, N.J.

[73] Assignee: NEC USA, Inc., Princeton, N.J.

[*] Notice: This patent is subject to a terminal disclaimer.

[21] Appl. No.: 08/791,738

[22] Filed: Jan. 31, 1997

[51] Int. Cl.⁷ .................................................. H04L 12/28
[52] U.S. Cl. ........................... 370/232; 370/280; 370/347; 370/349; 370/395; 370/401; 370/465; 370/463; 455/450
[58] Field of Search ..................................... 370/321, 337, 370/232, 412, 468, 474, 401, 278, 280, 336, 345, 352, 358, 389, 391, 392, 395, 349, 347, 465, 338, 466, 463; 395/310, 328, 470, 471; 455/465, 450

[56] References Cited

U.S. PATENT DOCUMENTS

| | | | |
|---|---|---|---|
| 4,003,032 | 1/1977 | Austin et al. | 340/172.5 |
| 5,274,768 | 12/1993 | Traw et al. | 395/275 |
| 5,329,572 | 7/1994 | Martens | 370/358 |
| 5,414,707 | 5/1995 | Johnston et al. | 395/425 |
| 5,452,420 | 9/1995 | Engdahl et al. | 395/285 |
| 5,461,627 | 10/1995 | Rypinski | 370/465 |
| 5,566,173 | 10/1996 | Steinbrecher | 370/230 |
| 5,638,371 | 6/1997 | Raychaudhuri et al. | 370/347 |
| 5,680,401 | 10/1997 | Gayton et al. | 370/474 |
| 5,745,684 | 4/1998 | Oskouy et al. | 395/200.8 |
| 5,751,951 | 5/1998 | Osborne et al. | 395/200.8 |
| 5,764,896 | 6/1998 | Johnson | 395/200.8 |
| 5,896,386 | 4/1999 | Johnston | 370/471 |
| 5,896,568 | 4/1999 | Tseng et al. | 370/337 |

FOREIGN PATENT DOCUMENTS

| | | |
|---|---|---|
| 6-77989 | 3/1994 | Japan . |
| 7-7491 | 1/1995 | Japan . |
| 8-107417 | 4/1996 | Japan . |
| WO9319559 | 9/1993 | WIPO . |

OTHER PUBLICATIONS

D. Raychaudhuri et al.; "WATMnet: A Prototype Wireless ATM System For Multimedia Personal Communication"; Jun. 23, 1996; pp. 469–477.

D. Raychaudhuri, et al., "ATM–Based Transport Architecture for Multiservices Wireless Personal Communication Networks", IEEE JSAC, vol. 12, No. 8, Oct. 1994.

D. Raychaudhuri, et al., "WATMNet: A Prototype Wireless ATM System for Multimedia Personal Communication", ICC '96.

R. Dighe et al., "The Multimedia C&C Platform (MCCP), A Network–Centric Architecture for Multimedia", IEEE ATM Workshop, Oct. 1995.

R. Dighe et al, "Architecture and Performance of HIPPI––ATM–Sonet Terminal Adapters", IEEE Communications, vol. 33, No. 4, Apr. 1995.

*Primary Examiner*—Alpus H. Hsu
*Assistant Examiner*—Daniel Previl
*Attorney, Agent, or Firm*—Sughrue, Mion, Zinn, Macpeak & Seas, PLLC

[57] ABSTRACT

A Network Interface Card (NIC) for integrating computers and other electronic equipment to a Wireless Asynchronous Transfer Mode (WATM) network is constructed so as to efficiently exchange data between a host and the wireless network. In addition to providing both ATM and AAL layer transfer protocols, the NIC also provides Data Link Control (DLC), Media Access Control (MAC), and Radio Physical (RPhy) layers as well.

30 Claims, 17 Drawing Sheets

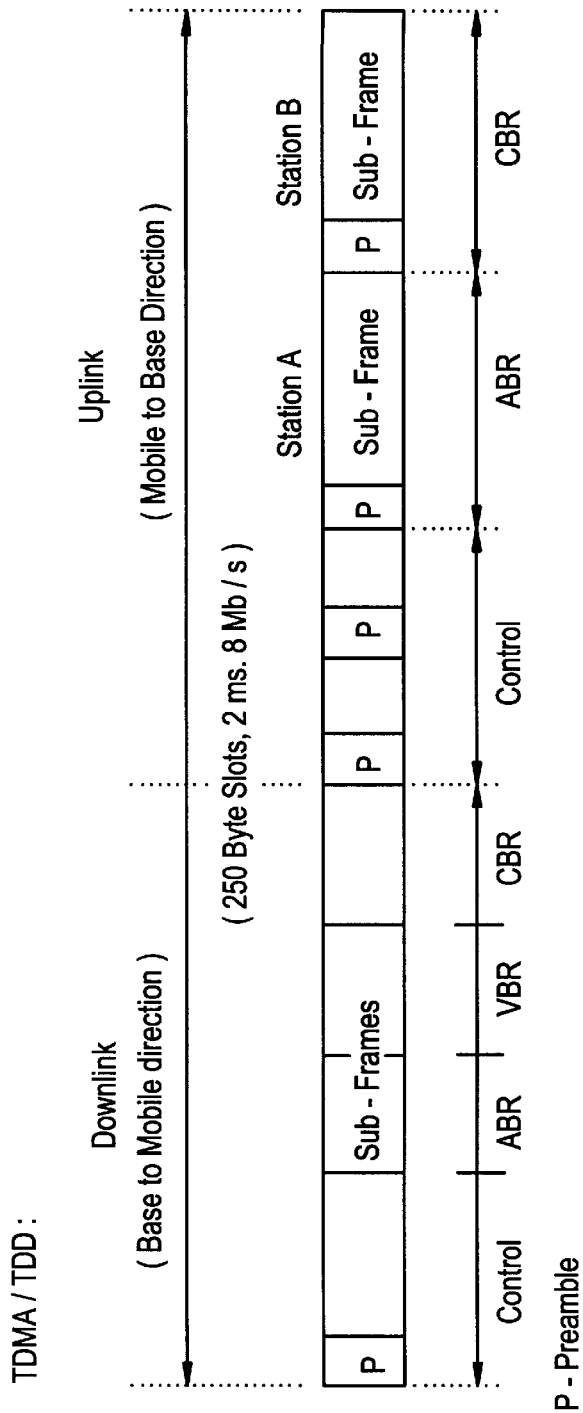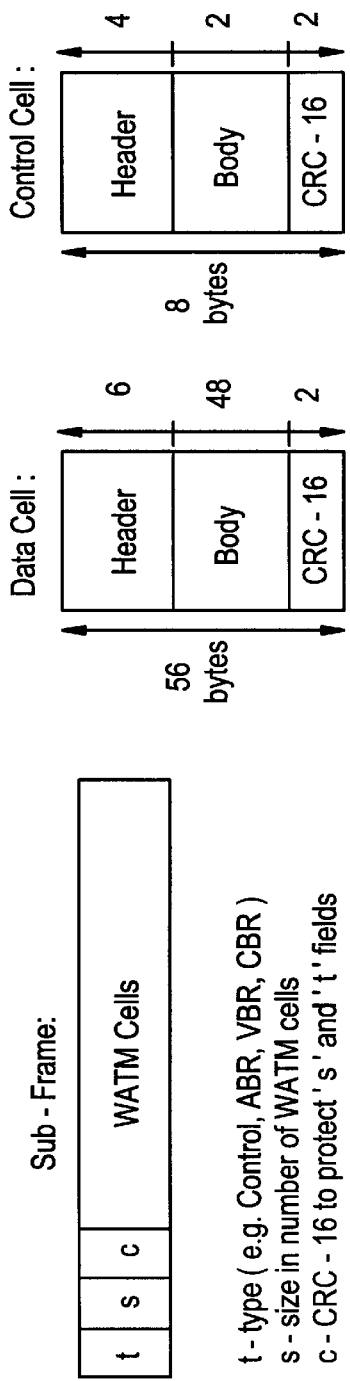

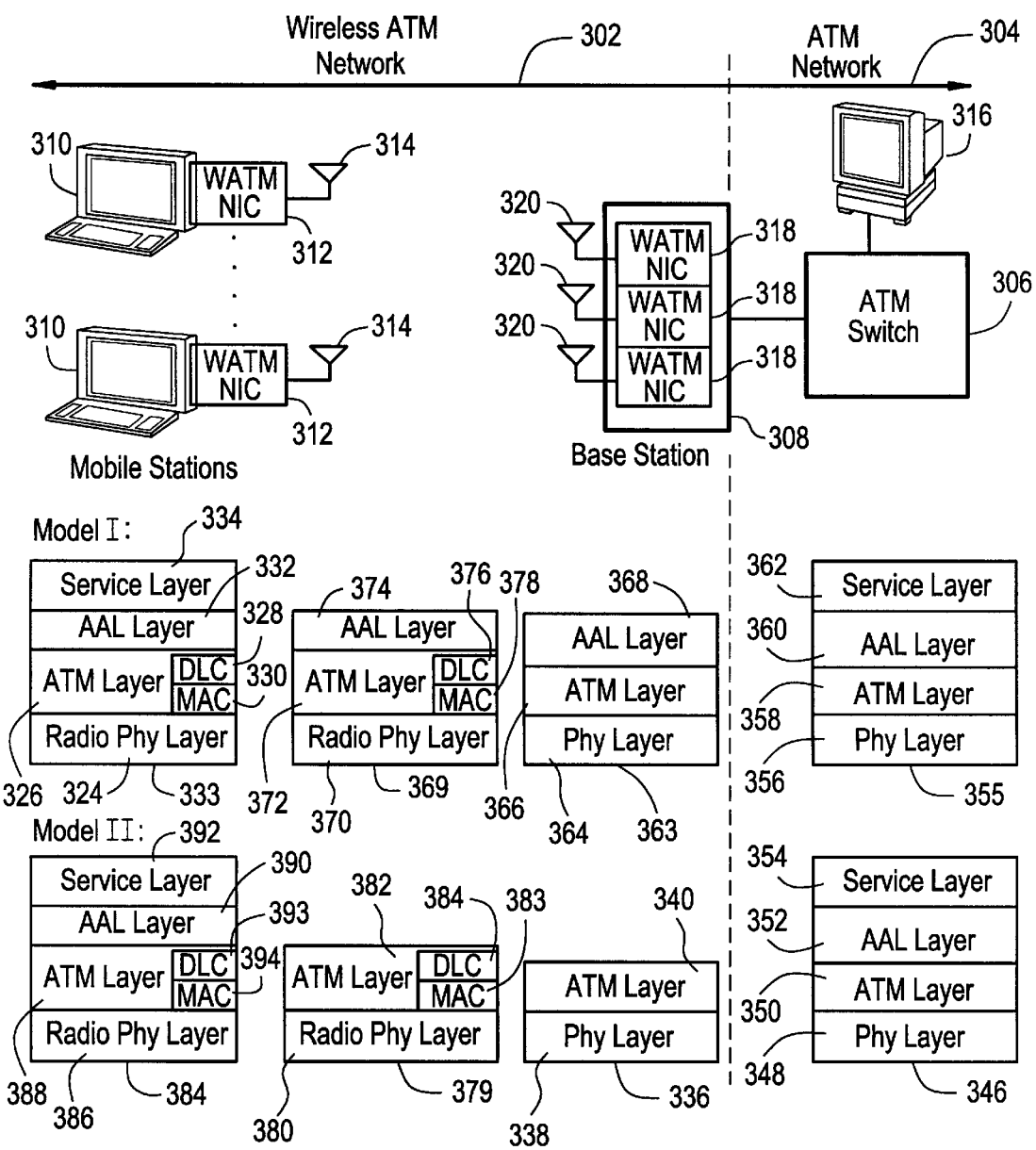

FIG.16

```
typedef struct {
    unsigned char gfc    :4;
    unsigned char vpih   :4;
    unsigned char vpil   :4;
    unsigned char vcih   :4;
    unsigned char vcim   :4;
    unsigned char vcil   :4;
    unsigned char pti    :3;
    unsigned char clp    :1;
} atmh;
```

( a ) ATM Header Structure Stored by v851 on a per Connection Basis.

```
typedef struct {                    typedef struct {
    unsigned char cpi        ;          unsigned char stype   :2;
    unsigned char btag       ;          unsigned char sn      :4;
    unsigned short basize    ;          unsigned char midh    :2;
    unsigned char etag       ;          unsigned char midl     ;
    unsigned short length    ;          unsigned char lind    :6;
} cs34;                             } sar34;
```

( b ) AAL 3/4 Overhead Structures Stored by v851 on a per Connection Basis.

Pointer Processor Transmitter RAM Partitioning.

Queue Region Functionality

NETWORK INTERFACE CARD FOR WIRELESS ASYNCHRONOUS TRANSFER MODE NETWORKS

BACKGROUND OF THE INVENTION

This invention relates generally to the field of telecommunications and in particular to a network interface card (NIC) for wireless communications and networking over an Asynchronous Transfer Mode (ATM) network and which provides high throughput for hosts of the network.

Asynchronous Transfer Mode (ATM) has long been advocated as an important technology for interconnecting wide area heterogeneous networks. In networks constructed utilizing ATM technologies, transported data is divided into small, fixed length units called cells. These cells are further divided into a header and data portion, with the header portion comprising identification, priority and routing information, and the data portion comprising actual data transported between systems.

An important distinguishing characteristic of ATM and networks constructed therefrom, is that it is an end-to-end technology, meaning that with ATM networks the protocols (ATM) are uniform throughout the entire network. That is to say, the ATM on the desktop is the same as the ATM on the Local Area Network (LAN), is the same as the ATM on the Wide Area Network. Consequently, organizations that employ ATM networks do not need extra equipment (like routers or gateways) to interconnect their networks thereby reducing the cost and complexity of the networks while at the same time improving their flexibility.

Due to these and other inherent advantages, there has been widespread and rapid deployment of ATM networks. This rapid deployment of ATM networks, and the contemporaneous need to provide reliable wireless ubiquitous information access to end users, has accelerated the development of Wireless ATM (WATM) networks. Presently, the development of WATM networks is still research oriented, and efforts to specify a standard for its protocol reference architecture are underway. See, for example, the article by D. Raychaudhuri et al., entitled "ATM-Based Transport Architecture for Multiservices Wireless Personal Communication Networks", which appeared in Vol. 12, No. 8 of IEEE JSAC in October 1994, or proceedings. An example of a Wireless ATM network which has been prototyped to ascertain the requirements for future WATM network has been described by D. Raychaudhuri et al., in an article entitled "WATMnet: A Prototype Wireless ATM System for Multimedia Personal Communication", ICC '96.

In WATMnet, as well as in other WATM networks, a Network Interface Card (NIC) is used to interface a piece of equipment to the WATM network. As can be readily appreciated by those skilled in the art, the architecture of a NIC plays an important role when accessing a high-performance network such as ATM. Specifically, the NIC can become a network bottleneck if its throughput characteristics are not taken into consideration while designing its architecture. Since the Data Link Control Layer (DLC), the Media Access Control Layer (MAC), and Physical Radio (RPhy) layers are integrated in a WATM NIC, the WATM NIC's processing requirements are more demanding than that of ATM NICs at equivalent transmission rates. (See, for example, R. Dighe et al., "The Multimedia C&C Platform (MCCP), A Network-Centric Architecture for Multimedia", IEEE ATM Workshop '95, October 1995; and C. A. Johnston, "Architecture and Performance of HIPPI-ATM-SONET Terminal Adapters", IEEE Communications, Vol. 33, No. 4, April 1995.) Thus, the design of a high-throughput WATM NIC software/hardware architecture remains a challenging problem.

Critical for the usefulness of such NIC adapters, is an efficient architecture that can allow network communications to proceed in parallel with other operations on a host without excessively slowing down those operations. Also critical to the efficiency of the entire network is a need that the adapter have minimal latency in reception and transmission of data. At the same time, the adapter must be economical to be suitable for accompanying host equipment.

Therefore, a need exists in the art for apparatus and methods which provide for the efficient and flexible wireless interfacing of computer and other electronic devices to ATM networks.

SUMMARY OF THE INVENTION

According to the invention, a network interface card that provides an interface between a host and a wireless asynchronous transfer mode based communications network, effectively and efficiently offloads and unburdens the host from the formatting, error checking and transmission of data over the wireless network. The network interface card advantageously employs an on-board controller, a local memory, on-board framing and error checking, as well as wireless transmission and receiving.

As a further aspect of the network interface card, data that is to be transmitted or received is advantageously stored within the network interface card according to type, thereby allowing the card to support a number of known, network protocols. As a still further aspect of the network interface card, an entire data link control protocol layer is provided on-board the card, further off loading the host from this low level function.

A further understanding of the nature and advantages of this invention may be realized by reference the remaining portions of the specification and drawing.

BRIEF DESCRIPTION OF THE DRAWING

The teachings of the present invention can be readily understood by considering the following detailed description in conjunction with the accompanying drawings, in which:

FIG. 2(a) is schematic TDMA frame showing downlink and uplink components;

FIG. 2(b) is a schematic sub-frame of the TDMA frame of FIG. 2(a);

FIG. 3 shows a wireless ATM network and associated communications protocol layers according to the teachings of the present invention;

FIG. 16 shows the data structures in the v851 processor;

DETAILED DESCRIPTION

Figure 1:
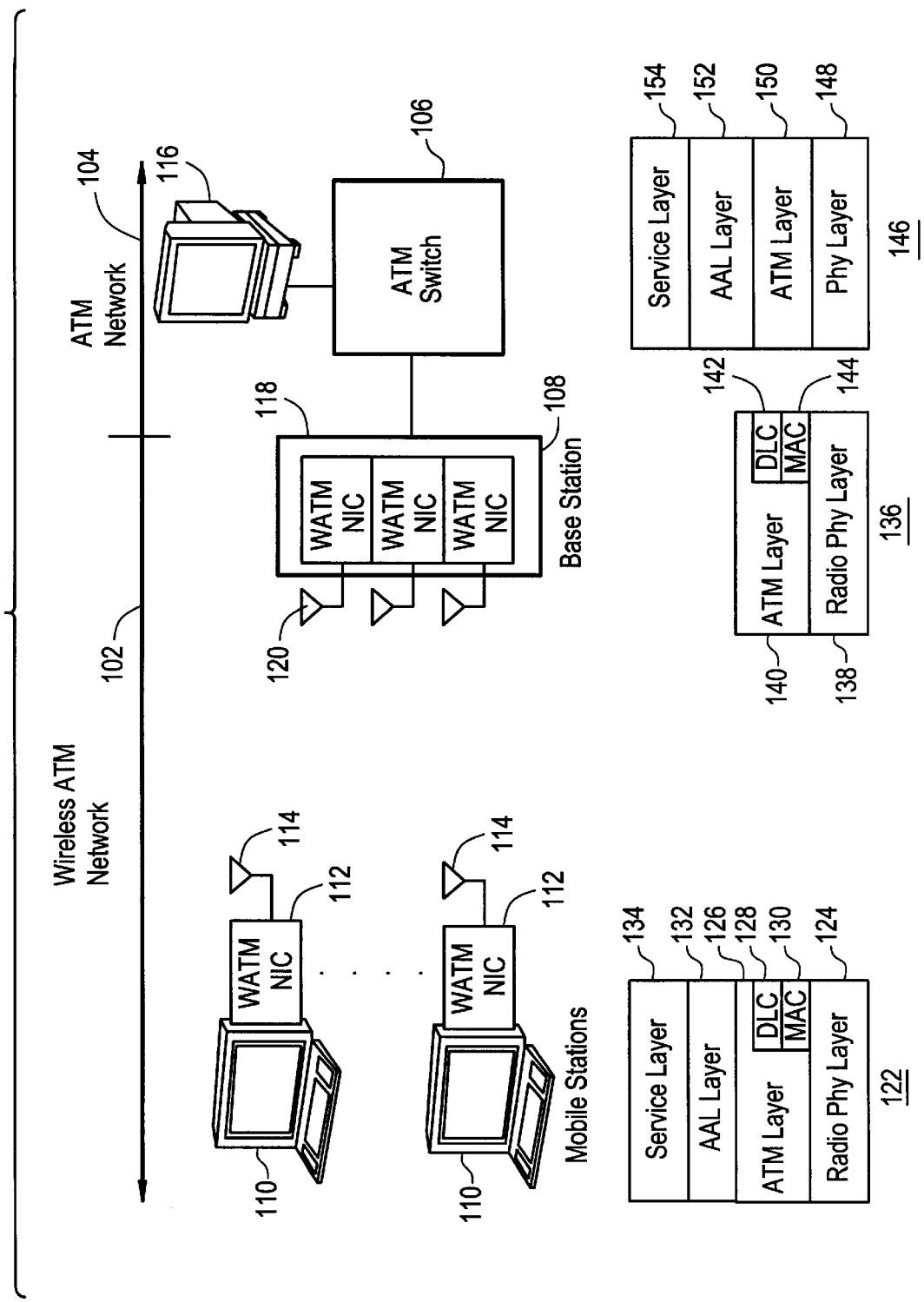
FIG. 1 shows a wireless ATM network interconnected with an ATM network according to the teachings of the present invention.

A preferred embodiment of the invention will now be described while referring to the figures, several of which may be simultaneously referred to during the course of the following description.

By way of introduction to the present invention and with reference to FIG. 2(a), WATMnet supports a Time Division Multiple Access (TDMA) transmission format of 8 Mb/s consisting of 250, 64-bit, slots every 2 ms. Time Division Duplexing (TDD) allows the TDMA frame to be partitioned into a Downlink (Base Station to Mobile Station), and Uplink (Mobile Station to Base Station) section. In the Downlink section, a Base station inserts a preamble on every frame starting at slot 1 in order to synchronize all Mobile stations.

A Sub-Frame or multiple sub-frames (FIG. 2 (b)) in the TDMA frame follow the preamble, a packet size word and an attached CRC for verification. The payload area carries information to all Mobile stations, and it is further divided into a number of Sub-Frame sections: i.e., a Control section, an Available Bit Rate Section (ABR), a Variable Bit Rate Section (VBR), a Constant Bit Rate Section (CBR) and an Unreliable Bit Rate (UBR) section (not shown). After gaining an understanding of the present invention, those skilled in the art will quickly recognize that other sections may be included as appropriate.

The Control section carries WATM control cells which are 8 bytes long and include a two byte Cyclic Redundancy Check (CRC-16). Control cells are interpreted by the DLC and MAC protocols for transmission control. Data cells are carried in the ABR, VBR, CBR and UBR Sub-Frame sections. Data cells are 56 bytes long and include a two byte CRC-16.

Each Sub-Frame section comprises a first word having 14 bits that indicates the number of WATM cells that the Sub-Frame transports, and two bits that identifies the Sub-Frame type. This first word is followed by a CRC-16 word which is used to ensure reliable transmission. Subsequent words contain WATM data cells. In the Uplink direction, Mobile stations assemble information into the cells in a manner similar to a Base.

With reference to FIG. 1, there it shows two mobile stations 110 (having WATM NICs 112 and antennas 114, and implementing transfer protocol layers 122 including a service layer 134 an AAL layer 132, an ATM layer 126 having DLC 128 and MAC 130 protocol layers, and a physical radio layer 124), on a wireless ATM network 102 communicating with a base station 108 (having WATM NICs 118 and antennas 120 and implementing transfer protocol layers 136 including ATM layer 140 having DLC 142 and MAC 144 protocol layers and a physical radio layer 138) which is co-resident on wired ATM network 104 (which includes a terminal 116 and an ATM switch 106 and implements transfer protocol layers 146, including service 154, AAL 152, ATM 150, and physical radio 148 layers). Specifically, and as shown in this Figure, the two Mobile stations 110, share a common Uplink.

At this point, understanding the functionality of the WATM network is essential in order to identify the requirements to implement Base and Mobile stations. Importantly, and according to the teachings of the present invention, by carefully merging common functions at the Base and Mobile, it is possible to obtain a generic WATM NIC architecture which can be shared as a building component.

Base Station

The Base station provides an interface for ATM networks to access the WATM network. With reference now to FIG. 3, a Base station 308 may advantageously be integrated with a number of WATM NICs 318 (having antennas 320), where each NIC serves a predetermined wireless cell area. Two different approaches can be taken in the design of a Base station. A possible architectural model scenario is to terminate AAL layer 368, at the Base 308, as in Model I (implementing transfer protocol layers 363 including AAL layer 368, ATM layer 366 and physical radio layer 364 and 369 including AAL layer 374, ATM layer 372, DLC 376, MAC 378 and radio physical layer 369). This approach provides a reliable transfer of information at the AAL layer between the ATM network 304 (which includes terminal 316 and ATM switch 306, and which implements transfer protocol layers 355 (including service layer 362, AAL layer 360, ATM layer 358, and physical radio layer 356) or transfer protocol layers 346 (including service layer 354, AAL layer 352, ATM layer 350, and physical radio layer 348)) and the Base. In the event that Incomplete Protocol Data Units (PDU) occur at the Base due to ATM cell losses, these cells are retransmitted between the Base and the ATM network only. Importantly, ATM network errors will not propagate in the wireless network and will not result in wasted bandwidth. The design of a Base station as a network terminator requires large amounts of memory for data storage and could result in an expensive implementation. However, data storage increases the transmission latency of PDUs having no transmission errors, thereby creating a negative impact on the performance of the overall system.

Alternatively, the Base may relay ATM cells to the wireless network, as depicted in Model II (implementing transfer protocol layers 336 including ATM layer 340 and physical radio layer 338 and 379 including ATM layer 382, DLC 381, MAC 383 and radio physical layer 380) shown in FIG. 3. With this approach, the Base station does not perform any AAL protocol functions, and data storage is only required to support the DLC protocol at the WATM cell level. As can be appreciated, the only ATM layer functions required are cell delineation and ATM header compression, which may be used in instances where not all ATM header bits are required by the WATM network. Even though ATM cell relaying may waste some wireless bandwidth due to PDU retransmissions, nevertheless it simplifies the Base implementation and cost, and reduces any cell transmission latency.

Mobile Station

The Mobile station provides end users of the wireless network with access to that wireless network. As shown in FIG. 3, the mobile station 310 (which includes WATM NIC 312 and antenna 314) implements all WATM transfer protocol layers 333, 384 (including service layer 334, 392, AAL layer 332, 390, ATM layer 326, 388 (having DLC protocol 328, 393 and MAC protocol 330, 394 layer), and Physical Radio layer 324, 386, respectively) in both model I and Model II, respectively. In WATMnet 302, a significant difference between the base station and the mobile stations is at the MAC protocol layer (383, 394). Specifically, Mobile stations (slaves) follow MAC control orders that are centrally processed at the Base station (master) and also support a Service layer 334 which provides an interface to end-users.

WATM NIC Architecture

The design of any WATM NIC architecture must take into consideration any hardware/software functional partitioning in order to obtain a flexible, high-performance adapter. Flexibility allows for easy upgrading and is an important characteristic of a NIC because WATM protocols are still evolving. As standards evolve and mature, however, well-defined functions can then migrate into dedicated software or hardware building blocks. Similarly, high-performance is required to guarantee a certain Quality of Service (QOS) for high-speed multimedia applications. Additionally, a high-throughput architecture advantageously makes use of limited bandwidth wireless media.

Figure 4:
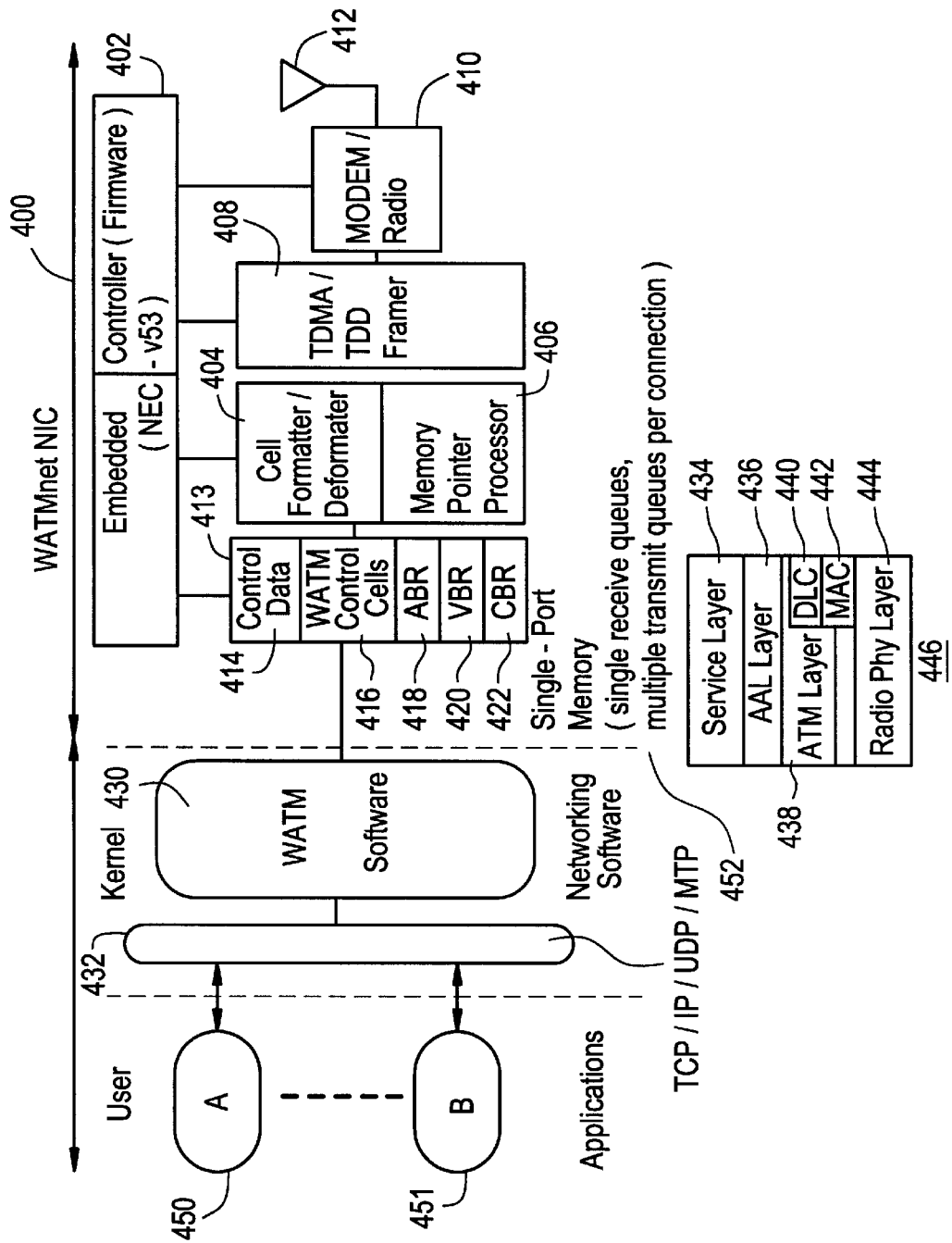
FIG. 4 is a block diagram showing the components of a WATM NIC according to the present invention.

Such a flexible, high-performance NIC is obtained according to the present invention by appropriately partitioning functions in software (either at the Host or at an embedded controller), and in hardware such as Field Programmable Gate Arrays (FPGA). One such implementation is the WATMnet NIC shown in FIG. 4 which supports three traffic classes: ABR, CBR, and VBR. As stated previously, other traffic classes may be advantageously supported as well, i.e., UBR. And while the block diagram of FIG. 4 depicts a Mobile NIC 400, those skilled in the art can quickly recognize that the same architecture can be used at the Base by implementing functions particular to the Base. For purposes of this discussion, layers of the reference architecture 446 (which includes service layer 434, AAL layer 436, ATM layer 438, and Physical Radio layer 444) are shaded identically to blocks in the NIC architecture where those respective layer functions are performed.

With further reference now to FIG. 4, multimedia applications 450, 451, running under any one of a variety of well-known operating systems, interface with a Host Kernel to access networking software such as Transmission Control Protocol Internet Protocol (TCP/IP), User Datagram Protocol (UDP), or Multimedia Transport Protocol (MTP), 432. As is known in the art, TCP/IP is often used and well suited for applications which do not require real time performance. However, in order to support real-time traffic such as CBR or VBR, other protocols such as MTP must be supported at the Mobile as well.

When messages are transmitted from the NIC over a wireless ATM network, PDUs are first processed by the WATM Software 430, which implement the functions of AAL layer 436 and ATM layer 438, in a multitasking environment. The requirement that the ATM layer generates CRC-16 on a per WATM cell is advantageously provided in hardware by the Cell Formatter/Deformatter 404. In a preferred embodiment, the DLC sub-layer 440 is also implemented in the WATM Software and operates on each WATM cell on a per connection basis. The DLC protocol manages Host local memory containing WATM cells and keeps track of transmitted cells and frees memory space when receiving DLC control acknowledgments.

Similarly, the MAC layer 442 is also partially implemented in the WATM Software block, and it is responsible for transferring WATM data cells to the NIC memory block, 413. A Host API 452, communicates with an Embedded Controller 402 within the NIC which facilitates the transfer of cells. Those skilled in the art will quickly recognize that one of many commercially available microcontrollers such as the NEC v53 microprocessor may be used to provide embedded controller functions such as WATM NIC system initialization and WATM Cell Queue Management.

WATM Cell Queue management is implemented in local memory 413, having different size queues, which are allocated to each active connection. Memory Pointer Processor module 406 complements the firmware contained within the microcontroller thereby supporting WATM Cell Queue Management. As preferably used, the Memory Pointer Processor offloads the microcontroller thereby relieving the microcontroller from data movement functions. A TDMA/TDD Framer 408, controls the transmission of WATM cells into a proper TDMA slot.

When downlink frames are received by the WATM NIC via antenna 412 and Modem/Radio 410, they are synchronized and delineated at the TDMA/TDD Framer. When a WATM control or data cell 414 is received, the microcontroller is notified and the "type" bits contained in the received Frame's Section Frame header. The "type" bits are then used by the microcontroller to inform the Memory Pointer Processor which Memory locations within memory 413 where incoming WATM cells are to be stored. Advantageously, the incoming WATM cells are stored in a FIFO manner. In a preferred embodiment, the receiver supports four different receive FIFO queues—one for each traffic class, namely, Control 416, ABR 418, VBR 420, and CBR 422 as well as others such as UBR.

While WATM cells are stored in the memory, a CRC-16 checking is performed by the Cell Formatter/Deformatter 404. In the Cell Formatter/Deformatter, a CRC is attached to each cell that is to be interpreted by the Host WATM Software 430. Advantageously, cells having errors as determined by a CRC check are dropped or processed as appropriate. This is of particular importance in applications supporting bit errors such as CBR voice or video where it might not be necessary to drop entire WATM cells. Importantly, the cell formatter/deformatter is variable and programmable and advantageously distinguishes between control and data Consequently the cell formatter/deformatter is able to append control and data CRCs as appropriate.

When WATM cells are stored in their respective queues, an interrupt signal is generated and sent to a Host (not shown) indicating that information is available. In a preferred embodiment, the Host implements a queue control methodology which determines the order in which data is to be moved into the Host. As an example, CBR data can be given priority over ABR data. A cell demultiplexing function is implemented in WATM Software to route information to a proper DLC protocol software task. All other required receive functions such as header processing/decompression, and ATM AAL layers may also be advantageously implemented in software.

Figure 5:
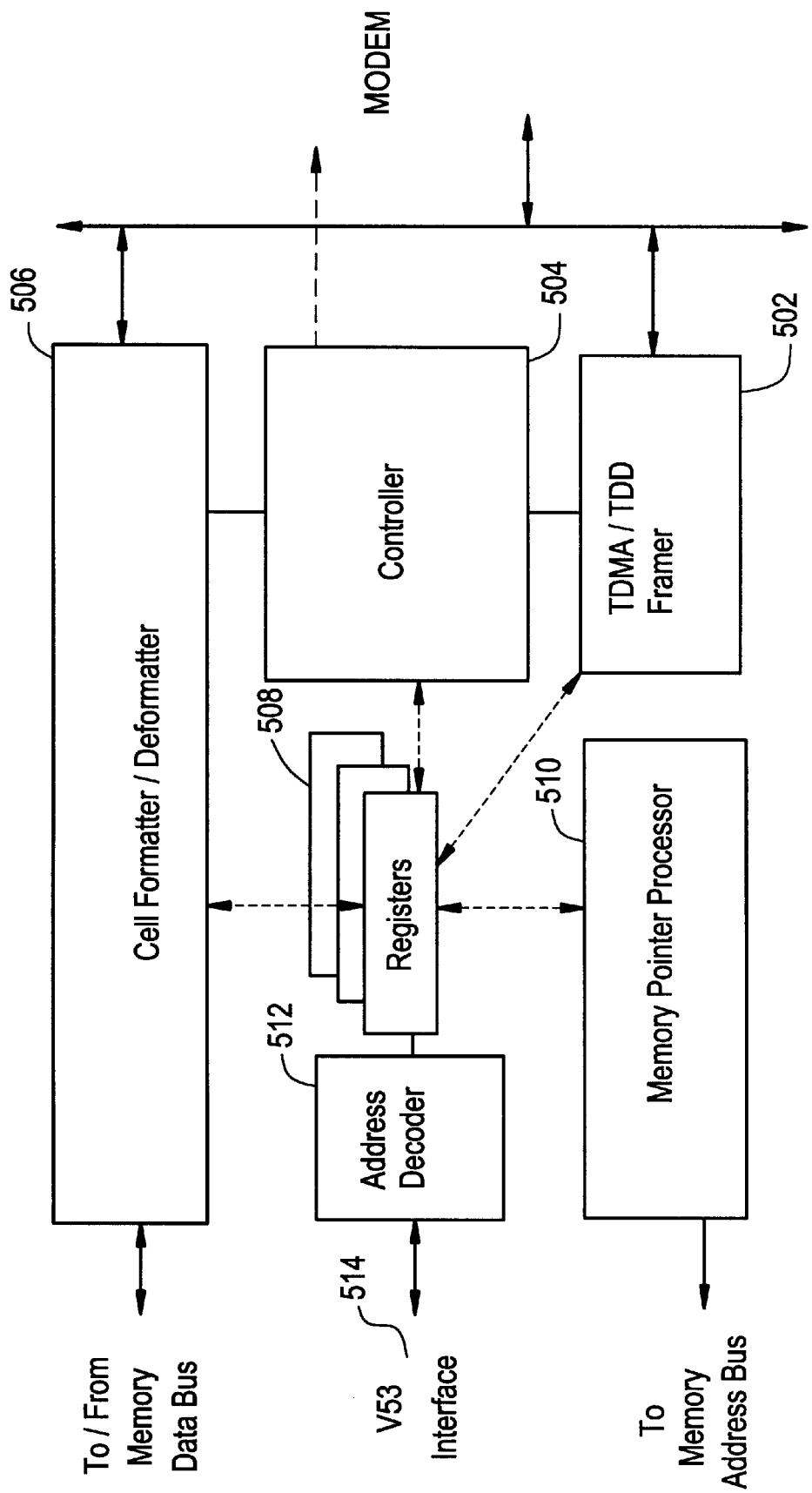
FIG. 5 shows a simplified hardware block diagram of the WATM NIC (modem not shown)

FIG. 5 shows a block diagram of the NIC hardware according to the present invention including, for example, Cell Formatter/Deformatter 506, Address decoder 512, Memory Pointer Processor 510, Controller 504, TDMA/SDD Framer 502, and Registers 508. The NEC v53 microcontroller Interface 514, is used to set up and interpret the contents of registers 508. The contents of the registers control the functions of all of the other components in the hardware (shown with dotted lines).

Figure 6:
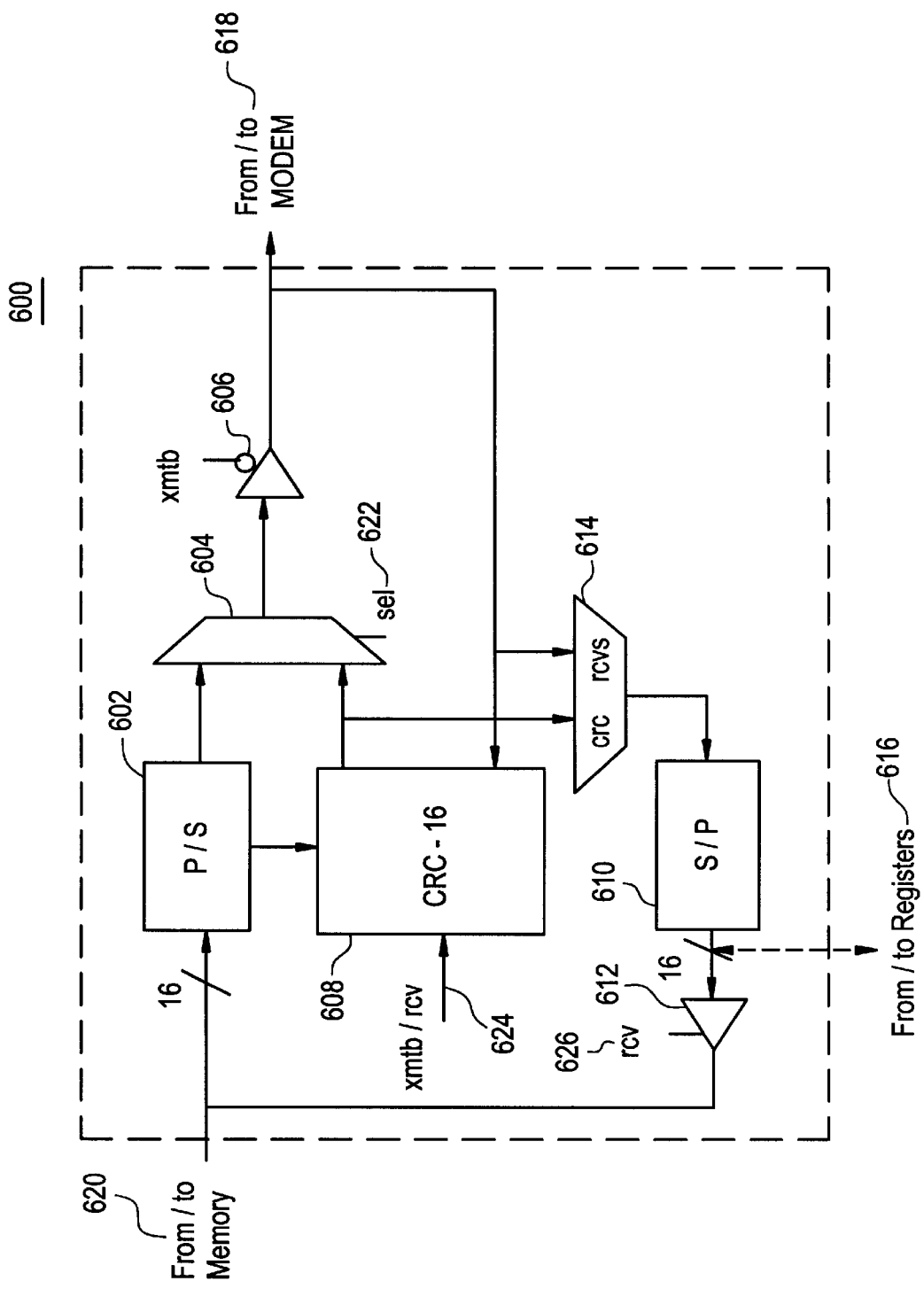
FIG. 6 is a block diagram of a Cell Formatter/Deformatter for the WATM NIC of FIG. 5.

With reference now to FIG. 6, there it shows a detailed view of the Cell Formatter/Deformatter 600. The Cell Formatter/Deformatter is preferably implemented as a half-duplex circuit, which may advantageously share hardware components for both transmission and reception of ATM cells. A signal designated 'xmtb' 606, is enabled when the Cell Formatter/Deformatter is ready for transmission. In this mode, data from Memory 620 (not shown) is read on a word basis, and it is latched in the Parallel-to-Serial (P/S) converter 602. The data is transferred towards the MODEM 618 (not shown) through a multiplexer 604 which is controlled by signal 'sel' 622. CRC-16 block 608 generates an error control code, which is attached at the end of each WATM cell as it propagates to the MODEM through the Cell Formatter/Deformatter.

When the Cell Formatter/Deformatter is in a receive mode, a 'xmtb' signal 624 is disabled while the 'rcv' 626 and 'rcvs' signals are enabled. Data, received from the MODEM is multiplexed by multiplexer 614 and then fed to Serial-to-Parallel (S/P) converter 610. The CRC-16 block generates a CRC value which is attached to each incoming cell when the 'crc' signal is enabled the 'rcvs' signal is disabled. Incoming subframe type information, such as the WATM cell VCI is provided to the microcontroller (not shown in this Figure) through the registers 616 (not shown) for interpretation by the Queue Management firmware.

Figure 7:
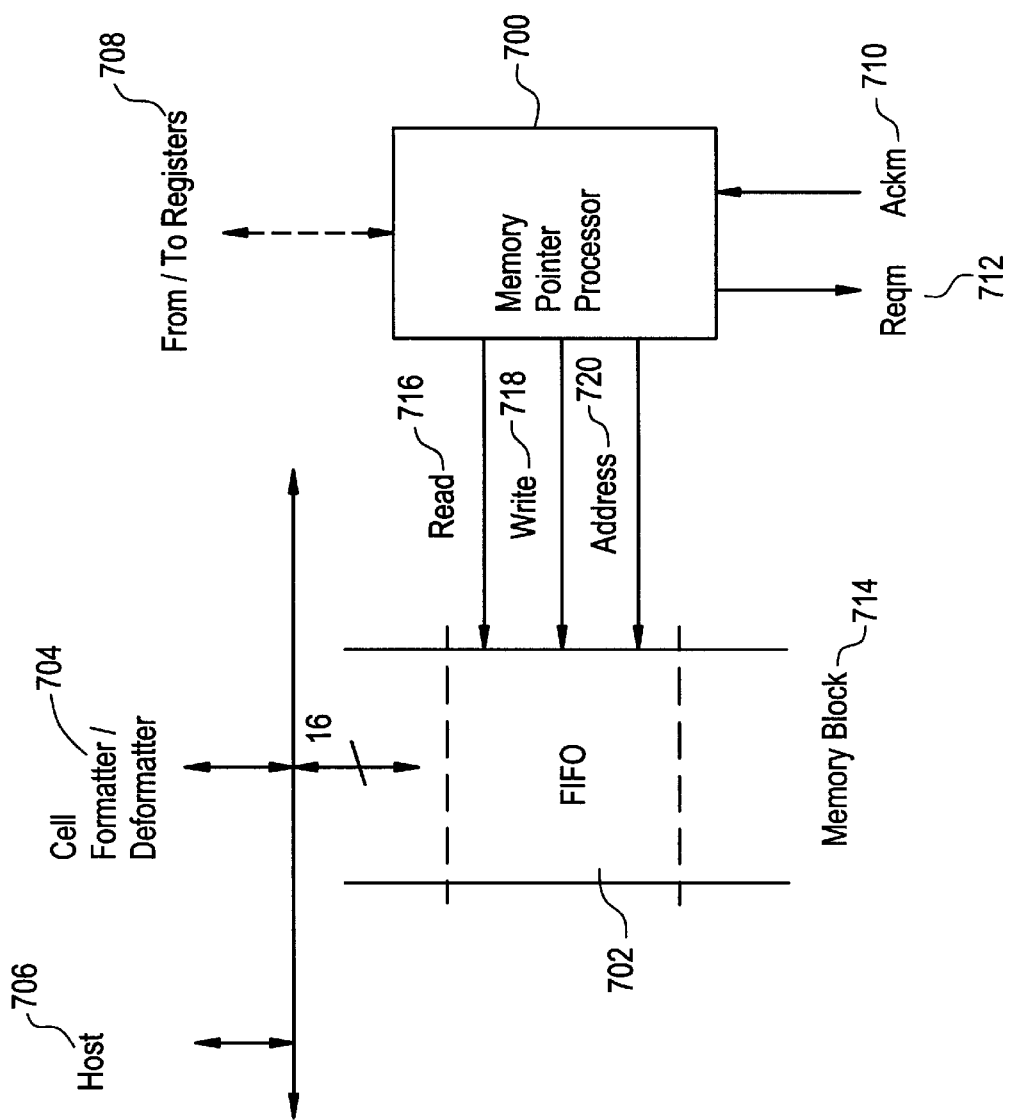
FIG. 7 is a diagram showing queue management in the WATM NIC of FIG. 6.

FIG. 7 is a block diagram showing queue management at the NIC which includes a Memory Pointer Processor, 700. Memory Pointer generation and management is performed within the microcontroller whenever information is read from or written to Memory block 714. The microcontroller maintains queue management memory parameters such as a read_queue (rq) pointer write_queue (wq) pointer, FIFO size (sz), and offset_address pointer (oa). These values are advantageously processed in hardware thereby implementing virtual FIFO queues 702 in the Memory block. The Memory Pointer Processor accesses the Memory by requesting bus control to the Controller block by asserting a request memory, 'Reqm' signal 712. The 'Reqm' signal is required to permit sharing access to the Memory by the Host 706, the microcontroller, and the Cell Formatter/Deformatter 704.

Upon receipt of an 'Ackm' signal 710 by the Memory Pointer Processor, Cell Formatter/Deformatter data can be read or written under the control of the Memory Pointer Processor. The Memory Pointer Processor generates any "Read" 716, "Write" 718 and "Address" signals 720 necessary to reference memory locations within the Memory. At the end of a transmit or receive data period, 'rq', 'wq', sz' and 'oa' values are updated and provided to the microcontroller through the Registers 708. All pointers are then saved by the microcontroller in a software structure for each connection. When the Memory Pointer Processor is finished with its operation, the 'Reqm signal is disabled.

Figure 8:
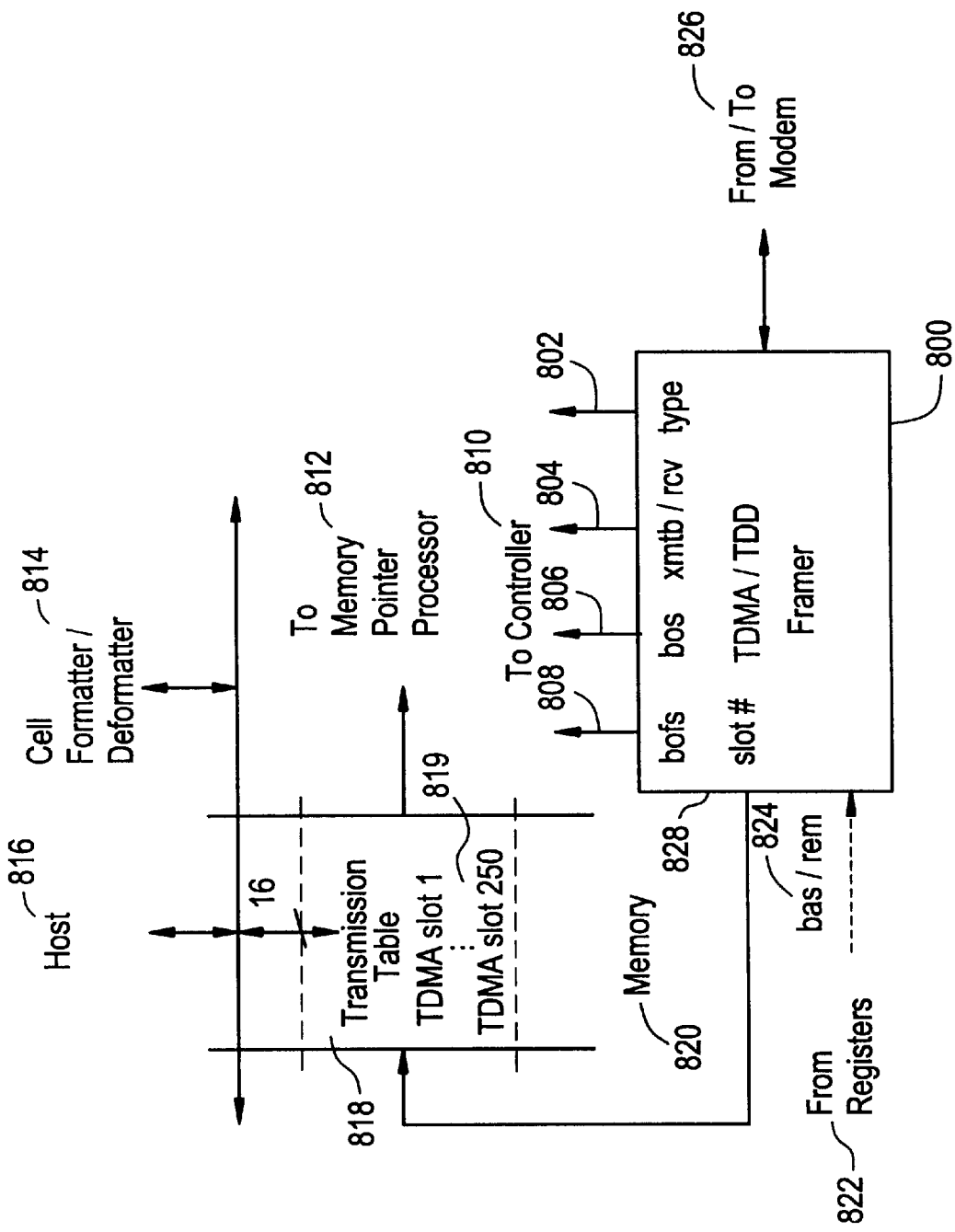
FIG. 8 is a block diagram of a TDMA/TDD Framer of the WATM NIC.

With reference now to FIG. 8, there it shows TDMA/TDD Framer 800 which delineates the RPhy layer as described previously. FIG. 8 also shows generalized interfaces with Host 816, Cell Formatter/Deformatter 814, and Modem 826. The Framer is configured according to a state of the base/remote, 'bas/rem' signal 824 through the Registers 822 thereby establishing operation as either a Base or Mobile (also known as Remote) station, accordingly. When the Framer is in the Base station mode, a beginning of frame slot ('bofs') signal 808, indicates to the Framer to insert the preamble starting at a first TDMA slot location.

All transmissions, whether occurring at a Base or Mobile, make use of a transmission table 818 contained in the Memory 820. In a preferred embodiment, the transmission table consists of 250 entries 819, each one of which represents a corresponding slot in a TDMA flame. Memory pointers at each Memory location are accessed by a 'slot #' signal 828 generated by the Framer. Each Memory pointer indicates a particular location to read and transmit. The pointers are passed to and processed by the Memory Pointer Processor 812 (not shown) to emulate FIFO functionality. A 'bos' signal 806 indicates the beginning of a slot within the TDMA frame. The Framer also generates 'xmtb/rcv' 804 and 'type' signals 802. The transmit receive ('xmtb/rcv') signal 804, is the same as the one used in the Cell Formatter/Deformatter. It indicates the TDD functionality of the Frame by delineating the boundaries of the transmit or receive payload. The signal from the Section frame indicates to the Controller 810 (not shown) whether WATM Control (8 bytes) or Data (56 bytes) cells should be processed by the NIC.

Figure 9:
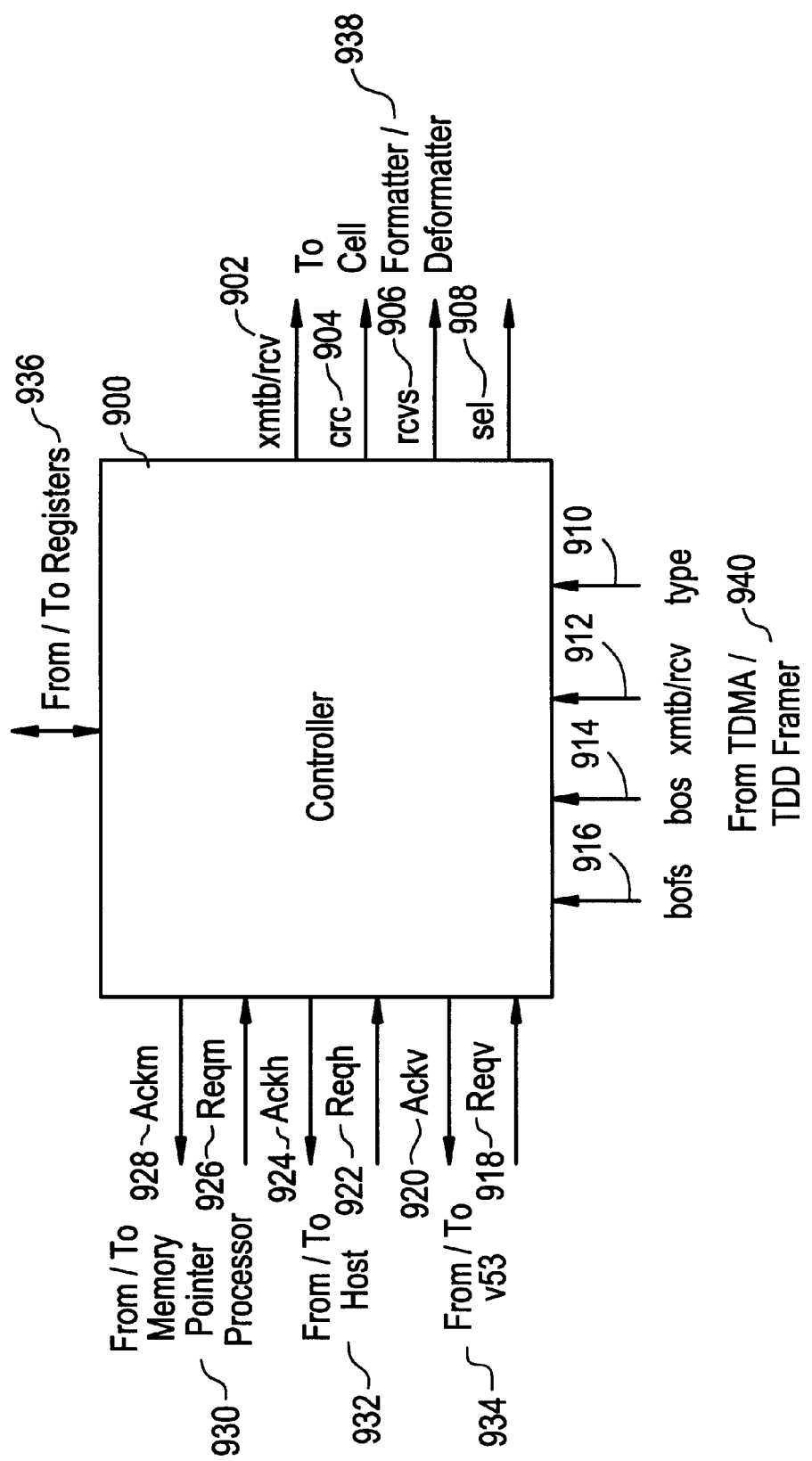
FIG. 9 is a block diagram of a Controller of the WATM NIC.

FIG. 9 shows a simplified block diagram of Controller 900 and its generalized interfaces, including interfaces with Registers 936, cell Formatter/Deformatter 938 (signals 'xmtb/rev' 902, 'crc' 904, 'rcv' 906, and 'scl' 908), TDMA/TDD Framer 940 (signals 'bofs' 916, 'bos' 914, 'xmtb/rev' 912, and 'type' 910), Memory Pointer Processor 930 (signals 'Ackm' 928 and 'Reqm' 926), Host 932 (signals 'Ackh' 924 and 'Reqh' 922), and v53 934 (signals 'Ackv' 920 and 'Reqv' 918). The Controller implements Finite State Machines which manage the hardware components previously described. Signals 'Reqh' 922, 'Ackh' 924, 'Reqv' 918, and 'Ackv' 920 are equivalent to the 'Reqm' and 'Ackm' signals described previously. The Controller arbitrates the priority for accessing the Memory by interpreting request signals and generating a proper acknowledgment.

Figure 10:
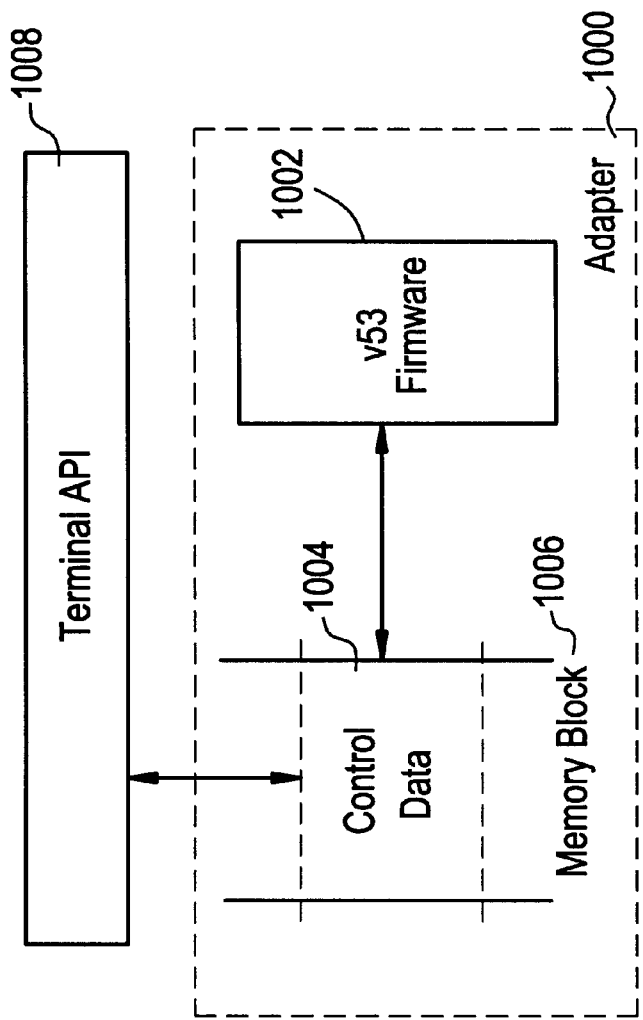
FIG. 10 is a block diagram showing the WATM NIC software partitioning.

As previously stated, the hardware/software partitioning of the WATM NIC plays an important role in determining whether the NIC is capable of providing a high-throughput end-to-end performance. In a preferred embodiment, Control software in the WATMnet NIC has been partitioned as shown in FIG. 10. A Host computer (not shown) interfaces to the NIC through an API 1008, which advantageously hides the hardware complexity and consists of a number of functional calls. Firmware within microcontroller 1002 interacts with the API through Memory 1006 to perform hardware control and to support the NIC's functionality.

The API performs operations which allows the Host to transfer and retrieve information from the NIC. The following are some of the important functions handled by the API: Adapter Initialization, Connection Setup, Data Transmission, Data Reception. When NIC Adapter 1000 is connected to a Host via suitable interface, i.e., PCMCIA, the API allows the downloading of configuration data for the microcontroller and the on-board Field Programmable Gate Arrays (FPGAs). The microcontroller begins execution of firmware code by initializing the Registers, and by setting up the Control, ABR, VBR, CBR and other (UBR) queues for data reception. Once the NIC Adapter card is ready for data processing, the microcontroller notifies the Host that the wireless network is ready for access through the Control Data area 1004 in the Memory 1006.

Before transmission or reception of data, a connection setup must occur. Specifically, the API is first used by the host to create a transmit CBR queue by requesting a queue from the microcontroller. Once a CBR queue has been created, WATM meta-signaling connection request messages can be sent to the WATM network. A Base will wait for meta-signaling packets coming from Mobile stations, while Mobile stations will wait for meta-signaling packets from the ATM network. The ATM network will allocate signaling VCIs and await for service connections setup from the ATM or WATM networks.

Upon a service connection request, the API provides three function calls to allocate ABR, VBR, or CBR queues. ABR queues have lower priority and can be allocated to any transmission slot based on the MAC. A CBR queue has a fixed size queue and slot allocation. Once it is setup, it does not have to be controlled by the MAC until the end of the connection. A VBR queue is flexible in terms of buffer size and also has a fixed slot allocation.

Once buffer queues have been allocated, the information can be transferred in or out of the NIC. The API also offers support for tearing down connections by de-allocating buffer space. De-allocated buffer space is subsequently returned to a Queue Management firmware process running in the microcontroller.

Exemplary Embodiment

Figure 11:
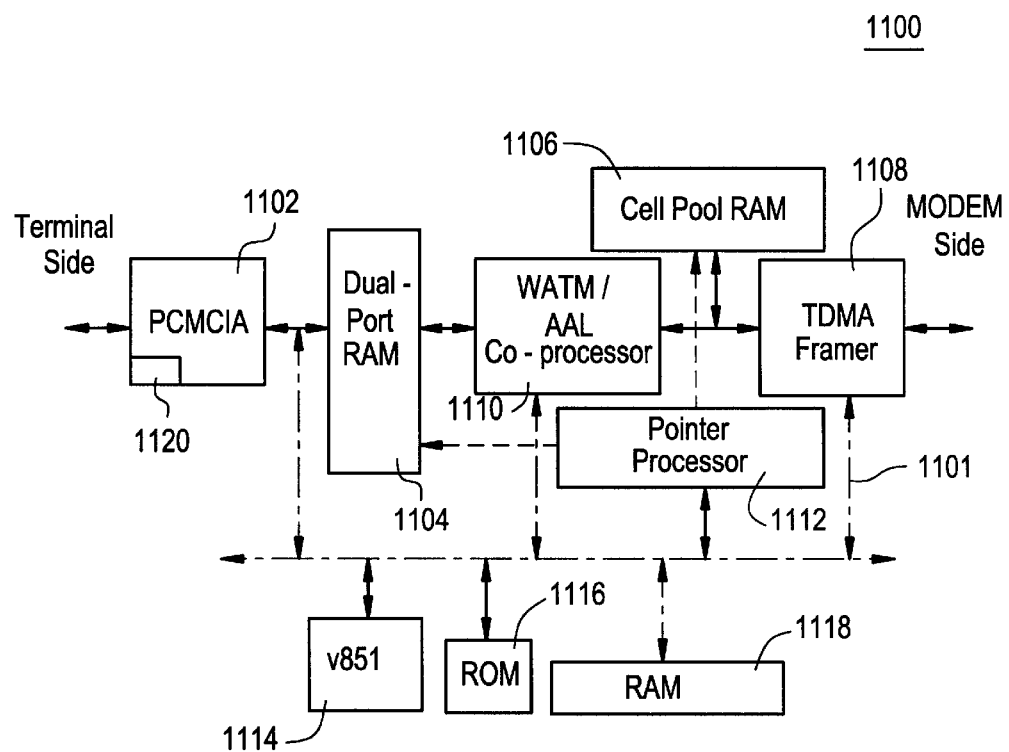
FIG. 11 shows a block diagram of the WATM NIC architecture of FIG. 1.

With reference now to FIG. 11 there it shows a block diagram of a Network Interface Card 1100 according to the present invention. The functional blocks comprising the Network Interface Card include PCMCIA interface 1102, Dual-Port RAM 1104, WATM/AAL processor 1110, Cell Pool Ram 1106, TDMA Framer 1108, Pointer Processor 1112, RAM 1118, ROM 1116 and v851 Microcontroller 1114 each interconnected via electrical and mechanical interconnect 1101. Those skilled in the art will quickly recognize that a variety of commercially available components may be selected for any of the above functional blocks.

The PCMCIA Interface 1102 is preferably implemented using a commercially available integrated circuit (IC) which supports the PCMCIA version 2.1 standard. Through the PCMCIA interface, Terminal equipment (not shown) accesses a Dual-Port RAM 1104, in a PCMCIA Common Memory configuration, to move data in and out of the NIC. Access to the Dual-Port RAM is shared with the Microcontroller 1114, i.e., v851 RISC processor, under the control of an arbiter 1120, implemented within the PCMCIA block. The arbiter gives higher access priority to the Microcontroller, which also maps its memory space to access the Dual-Port RAM. Through the Dual-Port RAM, Terminal equipment communicates with the network, and also exchanges information with the Microcontroller. Similarly, the Microcontroller can also exchange data with the network. This architecture allows to implement functions such as ATM signaling on board the NIC.

The Dual-Port RAM 1104 allows the decoupling of a terminal and network side of the NIC. In this configuration, the NIC throughput performance is improved by allowing the transfer of data from Terminal Equipment, or Microcontroller to the memory to occur while the network side simultaneously stores incoming data.

Figure 12:
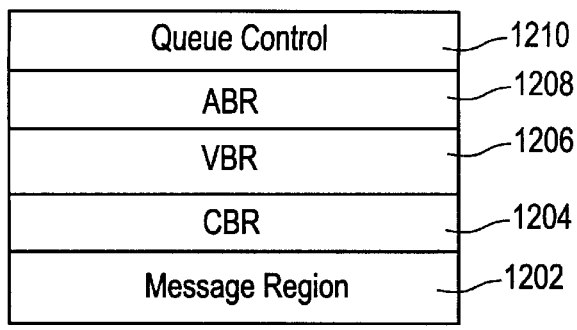
FIG. 12 shows dual-port RAM partitioning according to the present invention.

The Dual-Port RAM is partitioned in different regions as shown in FIG. 12. The Message region 1202 allows for the exchange of control messages between the Terminal Equipment and the Microcontroller, and between the Microcontroller and the wireless network. The ABR 1208, VBR 1206, and CBR 1204 regions implement a First In-First Out (FIFO) functionality to buffer the wireless traffic. Two FIFO's are incorporated per traffic class, one in the transmit direction and one in the receive direction. The Queue Control region 1210 contains data structures to accomplish the FIFO functionality of the ABR, VBR, CBR, and Message regions.

Figure 13:
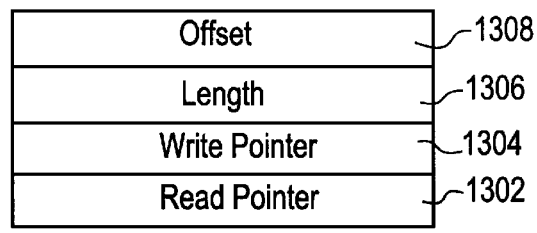
FIG. 13 shows a Queue Control Region FIFO Data Structure.

FIG. 13 shows the Queue Control Region FIFO Data Structure 1300. This region consists of data structures required to achieve FIFO functionality of the ABR, VBR, CBR, and Message regions. The Offset parameter 1308 indicates the start address of the FIFO in the RAM space. The Length parameter 1306 indicates the size of the FIFO being implemented. The Write Pointer 1304 stores the distance value from the Offset where data is stored. The Read Pointer 1302 is used in combination with the Offset parameter to indicate where data is to be retrieved from.

Whenever the Write and Read pointers are of equal value, the FIFO is empty. If the Write pointer starts catching up with the Read Pointer after a number of writes, the FIFO is considered full if the Write Pointer plus one is equal to the Read Pointer. When a FIFO is full, incoming data is dropped. The values of the Write and Read pointers are always reset to zero when either pointer reaches the value of the Length parameter, effectively creating a circular buffer. FIFO occupancy can be determined by using the Length, Write and Read pointers. If the Write pointer value is greater than the Read Pointer, then the FIFO occupancy is determined by the difference between the Write and Read pointer values. Otherwise, the occupancy is determined by subtracting from the Length, the value of the difference between the Read and Write pointers.

FIFO functionality is implemented in each of the ABR, CBR and VBR regions to store and retrieve data. The ABR region stores Available Bit Rate data, the VBR stores Variable Bit Rate data, and the CBR region stores Continuous Bit Rate data. Preferably, two FIFOs are implemented per region, one in the transmit direction and one in the receive direction. For each direction, a FIFO utilizes the structures previously described.

Figure 14:
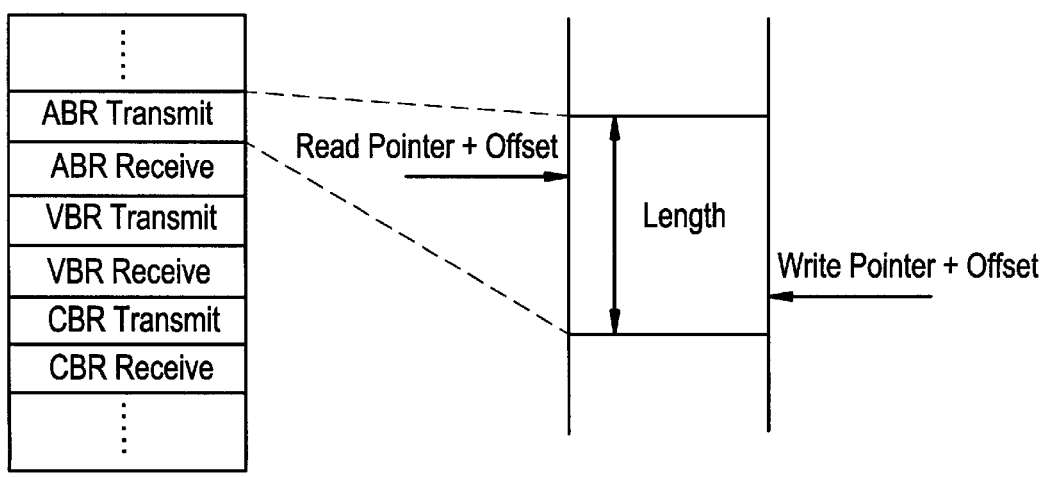
FIG. 14 shows FIFO implementation according to the present invention.

FIG. 14 shows an example of how FIFOs are implemented by partitioning the Dual-Port RAM. In this scheme, different FIFO sizes, based on the traffic class buffering requirements, can be obtained. By having different traffic class buffers, it is possible to implement a scheduling algorithm at the terminal to optimize the movement of time-sensitive data through the PCMCIA interface. Otherwise, it is also possible to implement a single FIFO area for movement of data across the PCMCIA interface to simplify the Terminal software implementation.

The Message region comprises four FIFOs implemented as described above. Two of the FIFOs provide for the storage of messages associated with Terminal to Microcontroller communications, while the other two provide for the transfer of messages between the Microcontroller and the wireless network. For example, before any connection can be established, the Microcontroller will use two of the FIFOs to run ATM signaling software with the WATM network. Once a signaling Virtual Circuit Identifier has been established, the Microcontroller will communicate with the Terminal thereby establishing connections in either the outgoing or incoming direction. When a Terminal requests to establish a connection, it will petition for permission to access the NIC resources through the Terminal to Microcontroller FIFOs.

In a preferred embodiment, the WATM Co-processor (FIG. 11) exhibits a pipeline architecture which allows for the flexible formatting of AAL 1, ¾ and 5, as well as ATM, and WATM cells. The Co-processor architecture has been designed by identifying generic building blocks required in the implementation of the above named transfer protocols. The WATM AAL Co-processor attaches to a main RISC CPU, in this case the v851, to relieve it from the burden of time-consuming operations by offering fast customized hardware processing. In general, the v851 keeps track of data structures on a per connection basis while data movement and formatting is performed by the Co-processor. In this manner, the v851 operating cycles are saved and can be effectively used to perform other functions.

Figure 15:
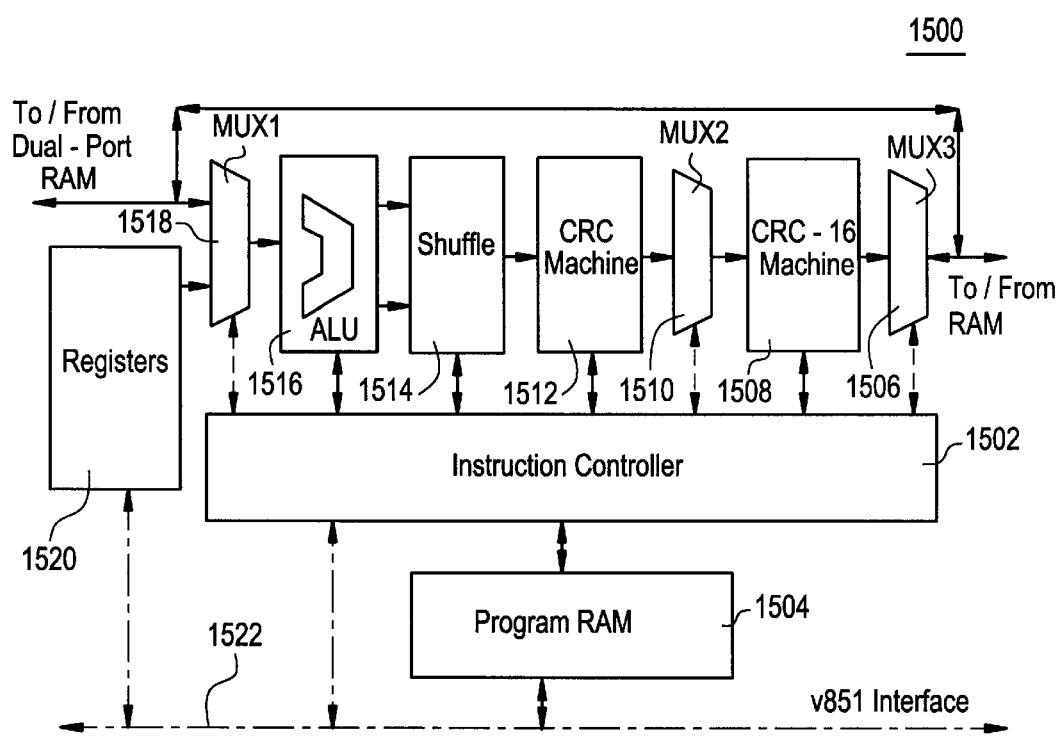
FIG. 15 is a block diagram showing WATM AAL Co-Processor architecture according to the present invention.

A block diagram of the Co-processor is shown in FIG. 15. It comprises seven pipeline stages containing generic blocks that can be effectively shared to obtain the formatting of the different AAL, ATM and WATM transport protocols. Preferably, the Coprocessor is memory mapped to the v851 to control its operation. Sets of instructions implementing the AAL, ATM, and WATM protocols are stored in the Program RAM 1504, where they are accessed and interpreted by the Instruction Controller 1502.

Registers 1520, are accessed by the v851, as shown by general v851 interface 1522, to insert protocol overhead data. The overhead data is stored in firmware structures within the v851. With reference now to FIG. 16, there it shows C-language structures for an ATM head (atmh), AAL¾ convergence sub-layer (cs34), and segmentation and reassemble sublayer overhead (sar34). In a transmission scenario, the v851 writes the contents of the software structures in the Registers, and it then initiates the Instructions Controller to start the desired protocol formatting program. At such time, the Co-processor handles data movement and data formatting. No further involvement is required by the v851. Thus, the v851 is relieved of time-consuming operations and can be effectively used in other operations. When the Co-processor is finished with its required instructions, the v851 data structures for a given connection can be updated with the values to be used in the next transmission cycle.

During data formatting, and with continued reference to FIG. 15, overhead is multiplexed by MUX1 1518 from the Registers with data from the Dual-Port RAM (not shown) to form the desired overhead data combination. The Co-processor incoming data is then circulated through the ALU stage 1516 which performs operations such as adding one to increment Sequence Number (SN) overhead, or to perform comparison when SN are received from the network. Data is then operated on by the Shuffle stage 1514, which performs dedicated AAL 1 and AAL ¾ bit shifting manipulations in one cycle time. Subsequently, within the CRC Machine stage 1512, specialized hardware implements CRC-3, CRC-8, CRC-10, and CRC 32 which operates simultaneously on the data continuously. When a CRC has been calculated, it is then inserted through the multiplexer MUX2 1510 at a location controlled by the Co-processor program. For Wireless ATM applications the CRC-16 machine 1508 allows the generation of CRC overhead and attaches it to the data through the control of the third multiplexer MUX3 1506. The output of MUX3 is stored in the Cell Pool RAM (not shown) under the control of the Pointer Processor.

The Pointer Processor (PP) generates memory address locations where data is to be stored or retrieved by the WATM AAL Co-processor, and by the TDMA block of FIG. 11. The PP includes two parts, the first (PP-I) controls the information writing or reading of the Dual-Port RAM, and the second (PP-11) implements queue management of the Cell Pool RAM.

Figure 17:
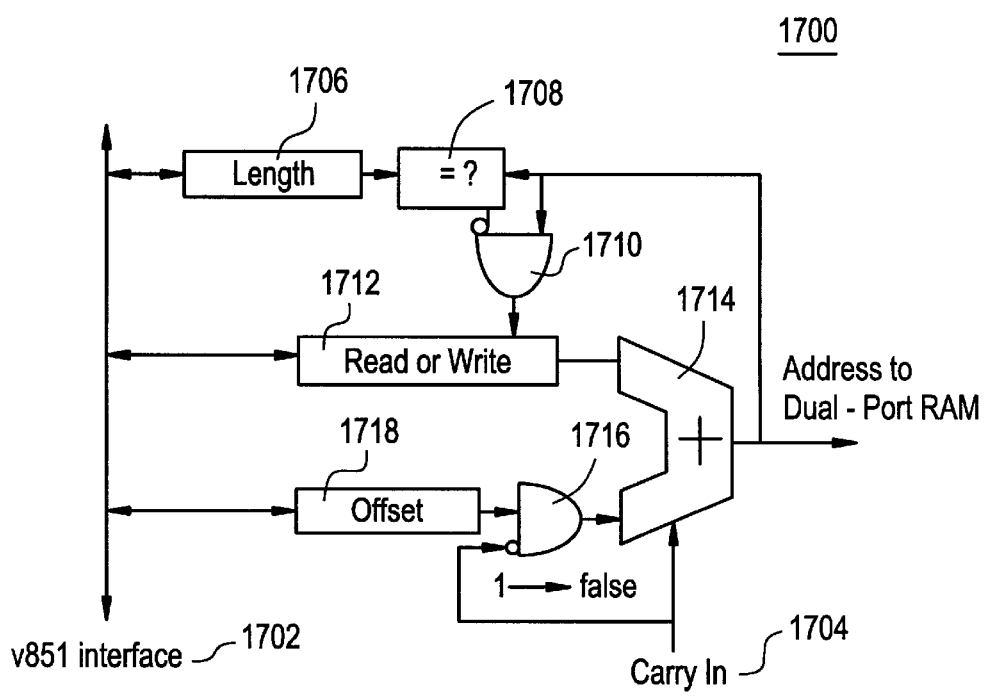
FIG. 17 depicts dual-port address generation.

FIG. 17 shows one implementation of the PP-I address generator side 1700. Through the v851 interface 1702 internal registers are loaded with the values contained within the Queue Control Region. In a store cycle, the Write pointer is used, while in the retrieve cycle the Read pointer is used. These pointers are incremented by one by the 'Carry In' signal 1704 which is delivered to an adder 1714 and an AND gate with a single inverted input 1716. The Length value 1706 is compared at 1708, with the adder output. The output of adder 1714 and the result of compare at 1708 are processed at an AND gate with a single inverted input 1710 to rollover the Read or Write pointers 1712 to zero whenever the FIFO length is reached. In this manner, a circular queue functionality is effectively achieved. By adding the Read or Write pointers to the Offset value 1718 (processed at gate 1776), the address where data is to be stored or retrieve at the Dual-Port RAM is obtained. After a write or read cycle is finished, the v851 retrieves the new Write or Read pointers and updates the Queue control structure for later use.

Figure 18:
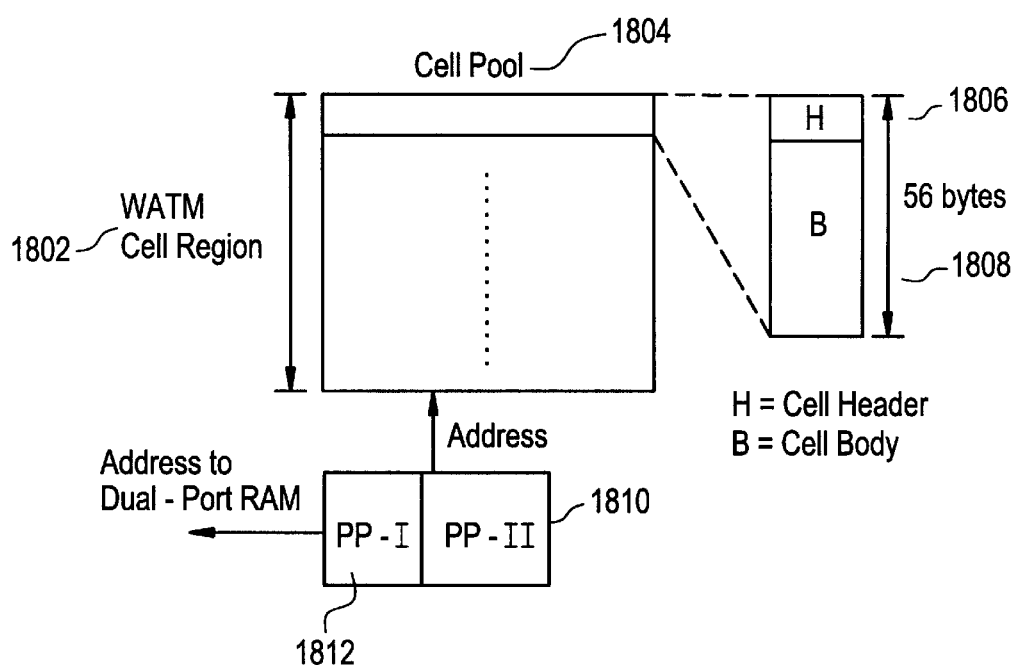
FIG. 18 shows the Cell Pool RAM partitioning.

The PP-II generates the memory address locations for the Cell Pool RAM. It provides queue management control on a per connection basis, while also providing functionality that is required to support the DLC protocol. The Cell Pool RAM 1804 is partitioned as shown in FIG. 18 (FIG. 18 also shows a Pointer Processor having a PP-I part 1812 and a PP-II part 1810). The WATM Cell Region 1802 is partitioned into a number of 56 byte regions, each region having a header 1806 and a body 1808 and which serve to store WATM cells in the transmit and receive directions. WATM cells can then be linked by emulating FIFO functionality using the following technique that merge Queue Management and DLC operation requirements in a single novel architecture.

Advantageously, ATM queue management and DLC is provided in such a manner as to support virtual queues on a per connection basis with the capabilities of WATM cell retransmission and cell reordering.

Figure 19A:
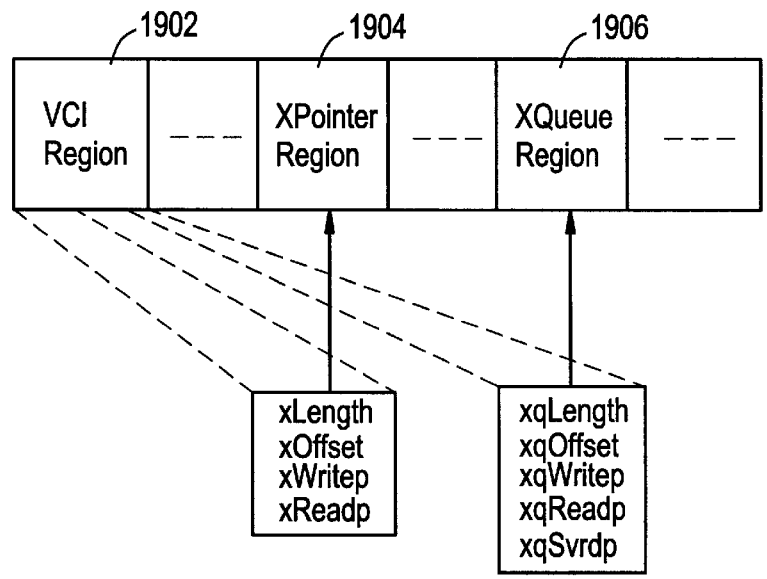
FIG. 19(a) shows Pointer Processor Transmitter RAM Partitioning.
Figure 19B:
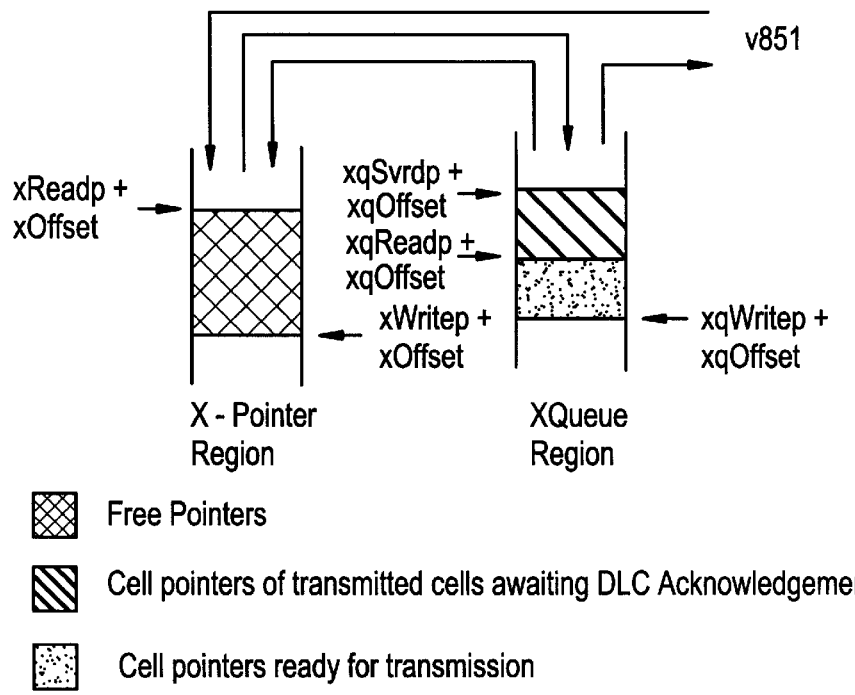
FIG. 19(b) shows the Queue Region functionality of FIG. 19(a)

With reference now to FIG. 19 (*a*), there it shows the partitioning of RAM memory residing within the Pointer Processor Unit shown in FIG. 11 in the transmit direction. A VCI Region 1902, comprises data structures which permit the emulation of FIFO functionalities of the Xpointer 1904 and Xqueue 1906 regions, respectively. The Xpointer Region contains free start address pointers which indicate where WATM cells can be stored in the Cell Pool RAM. These pointers are stored in a FIFO manner using the technique previously explained and need to be incremented by 28 every 16-bit transfer of a WATM cell. The XQueue region contains the address pointers of stored cells in the Cell Pool RAM.

FIG. 19(*b*) shows the structure of the Xpointer and XQueue Regions. The size of the Xpointer Region determines the queue size for a given connection based on its quality of service (QOS) requirements. A number of Address Pointers which guarantee the required QOS is stored in this region. These pointers are referred to as Free pointers, and are initially managed within the v851.

Various embodiments of the invention have been described. The descriptions are intended to be illustrative, not limitative. Thus, it will be apparent to one skilled in the art that certain modifications may be made to the invention as described without departing from the from the broad principle and spirit of the invention which shall be limited solely by the scope of the claims appended hereto.

What is claimed is:

1. A network interface card for providing an interface between a host and a wireless asynchronous transfer mode based communications network, which comprises:

a controller means for controlling the network interface card;

a memory means, connected to said controller means, for providing cell queue management and wherein said memory means is partitioned into a plurality of areas and data of a single type is stored within a given one of said plurality of areas;

a cell formatter/deformatter means, connected to said memory means and a MODEM/radio means, for providing error checking on cells processed by the network interface card;

a memory pointer processor means, connected to said cell formatter/deformatter means, for providing data movement functions such that said controller means is relieved of these data movement functions;

a TDMA/TDD framer means, connected to said controller means, for synchronizing and delineating frames received by said network interface card;

MODEM/radio means, connected to said controller means and said TDMA/TDD Framer means, for modulating and demodulating cells to be transmitted and received from said wireless asynchronous transfer mode communications network; and an antenna means, connected to said MODEM/radio means, for sending and receiving cells over said wireless asynchronous transfer mode communications network.

2. The network interface card according to claim 1, wherein said memory means further comprises a plurality of different sized queues, each allocated to an active connection and said areas comprise a control data area, a WATM control cells area, an ABR area, a VBR area a CBR area and a UBR area.

3. The network interface card according to claim 2 wherein each one of said ABR area, VBR area and CBR area employs a first in-first out methodology to buffer cells transmitted and received from the wireless asynchronous transfer mode communications network.

4. The network interface card according to claim 3 wherein said memory means further comprises two first in-first out buffers per traffic class, one in the transmit direction and one in the receive direction.

5. The network interface card according to claim 2 wherein said cell formatter/deformatter means further comprises:

a parallel to serial converter means, connected to said memory means, a first multiplexing means and a CRC means, for converting data read from the memory means into serial data suitable for transmission over the wireless asynchronous transfer mode communications network;

CRC means, connected to said parallel to serial converter means, said first multiplexing means, a second multiplexing means and said MODEM/radio means, for generating and detecting errors in cells transmitted and received from the wireless asynchronous transfer mode communications network;

the first multiplexing means, connected to the CRC means, the parallel to serial converter means and the MODEM/radio means, for multiplexing data output from the CRC means with data output from the parallel to serial converter means for subsequent presentation to the MODEM/radio means;

the second multiplexing means, connected to the MODEM/radio means and the CRC means, for multiplexing data received from the MODEM/radio means with an output of the CRC means;

a serial to parallel converter means, connected to the second multiplexing means and the memory means, for converting serial data received and multiplexed by the second multiplexing means into parallel data for presentation to the memory means.

6. The network interface card according to claim 5 further comprising:

a transmission table having a plurality of entries, each one of which represents a corresponding slot in a TDMA frame.

7. The network interface card according to claim 6 further comprising:

a data link control (DLC) means, included within the memory means, the memory pointer processor means and the controller means, for constructing/deconstructing frames for a transmitted/received bit stream.

8. A network interface card for providing an interface between a host and a wireless asynchronous transfer mode based communications network, which comprises:

a local bus for interconnecting components on the card;

a bus interface means, connected to the local bus and a system bus contained within the host, for interconnecting the local bus to a system bus contained within the host;

a controller means, connected to the local bus, for controlling local operations on the network interface card;

a randomly-accessible memory means, connected to the local bus, for storage of working program and data;

a read-only memory means, connected to the local bus, for storage of program code and data necessary for operating the controller means;

a dual-ported memory means; connected to the local bus and the bus interface means, for providing communication between the network interface card and the host, said dual-ported memory being partitioned into a plurality of different regions wherein each region stores a particular type of data;

a WATM/AAL co-processor means, connected to the dual-ported memory means and the local bus, for formatting cells into different AAL, ATM and WATM transport protocols;

a cell pool ram means, connected to the WATM/AAL co-processor means, and the pointer processor means, for buffering cells to be transmitted or received by the network interface card;

a TDMA framing means, connected to the WATM/AAL co-processor means, the local bus means, and the cell pool ram means, for synchronizing and delineating frames received by the network interface card;

a memory pointer processor means, connected to the WATM/AAL co-processor means, the local bus means, and the dual-ported memory means, for generating address locations indicating where data is to be stored or retrieved by the WATM AAL co-processor means and the TDMA framing means;

MODEM/radio means, connected to the local bus means and the TDMA/TDD Framer means, for modulating and demodulating cells to be transmitted and received from the wireless asynchronous transfer mode communications network; and an antenna means, connected to said MODEM/radio means, for sending and receiving cells over said wireless asynchronous transfer mode communications network.

9. The network interface card according to claim 8 wherein said dual-ported memory means further comprises:

a message region, which stores control messages exchanged between the host and the controller means and the wireless asynchronous transfer mode communications network and the controller means;

a control region;

an ABR region;

a VBR region; and a CBR region wherein each one of the ABR, VBR and CBR regions implement a first-in first-out methodology to buffer cells transmitted or received from the wireless asynchronous transfer mode communications network.

10. The network interface card according to claim 9 wherein said dual-ported memory means further comprises:
a pair of first-in first out structures for each one of the ABR, VBR and CBR regions respectively wherein each pair of first-in first out structures includes a transmit first-in first out structure and a receive first-in first out structure.

11. The network interface card according to claim 10 wherein said control region of the dual ported memory means further comprises:
an offset parameter which indicates a start address of a first-in first out structure;
a length parameter which indicates a length of the first-in first out structure addressed by the offset parameter;
a write pointer which indicates a distance value from the offset address where data is to be stored in the first-in first out structure; and
a read pointer which indicates a distance value from the offset address where data is to be read in the first-in first out structure.

12. The network interface card according to claim 8 wherein said WATM/AAL co-processor means further comprises:
an instruction controller for controlling the WATM/AAL co-processor;
a program ram, connected to the instruction controller which contains a set of instructions that when operated on by the instruction controller, implement AAL, ATM and WATM transport protocols;
a set of pipeline stages, connected to the dual-ported memory means, the randomly accessible memory means, a set of registers and the instruction controller, that formats AAL, ATM and WATM cells; and
the set of registers which contain protocol overhead data inserted by the controller means.

13. The network interface card according to claim 12 wherein said set of pipeline stages comprises:
a first multiplexer stage, connected to the dual-ported memory means, the set of registers and the instruction controller for multiplexing the overhead data contained in the set of registers with data contained in the dual-ported memory means;
an ALU stage, connected to the first multiplexer stage and the instruction controller, that operates on a sequence number contained within the multiplexed data;
a shuffle stage, connected to the ALU stage and the instruction controller, which performs bit shifting on the multiplexed data;
a CRC stage, connected to the shuffle stage and the instruction controller, that generates a CRC for the multiplexed data;
a second multiplexer stage, connected to the CRC stage and the instruction controller, that multiplexes the generated CRC with the multiplexed data thereby generating second multiplexed data;
a CRC-16 stage, connected to the second multiplexer stage and the instruction controller, for generating a CRC-16 of the second multiplexed data;
a third multiplexer stage, connected to the CRC-16 stage, the cell pool ram means and the instruction controller, that multiplexes the second multiplexed data with the generated CRC-16.

14. The network interface card according to claim 13 wherein said pointer processor means further comprises:
a PP-I section which controls the reading and writing of data to and from the dual-ported memory means; and
a PP-II section, which generates memory address locations of the cell pool ram means.

15. The network interface card according to claim 10 wherein each one of said regions is further sub-divided into a set of sub-regions, such that each one of said sub-regions is associated with a particular connection.

16. A network interface card for providing an interface between a host and a wireless asynchronous transfer mode based communications network, which comprises:
a controller for controlling the network interface card;
a memory, connected to said controller, for providing cell queue management and wherein said memory is partitioned into a plurality of areas and data of a single type is stored within a given one of said plurality of areas;
a cell formatter/deformatter, connected to said memory and a MODEM/radio, for providing error checking on cells processed by the network interface card;
a memory pointer processor, connected to said cell formatter/deformatter, for providing data movement functions such that said controller is relieved of these data movement functions;
a TDMA/TDD framer, connected to said controller, for synchronizing and delineating frames received by said network interface card,
wherein said MODEM/radio is, connected to said controller and said TDMA/TDD framer, for modulating and demodulating cells to be transmitted and received from said wireless asynchronous transfer mode communications network; and
an antenna, connected to said MODEM/radio, for sending and receiving cells over said wireless asynchronous transfer mode communications network.

17. The network interface card according to claim 16, wherein said memory further comprises a plurality of different sized queues, each allocated to an active connection and said areas comprise a control data area, a WATM control cells area, an ABR area, a VBR area a CBR area and a UBR area.

18. The network interface card according to claim 17, wherein each one of said ABR area, VBR area and CBR area employs a first in-first out methodology to buffer cells transmitted and received from the wireless asynchronous transfer mode communications network.

19. The network interface card according to claim 18, wherein said memory further comprises two first in-first out buffers per traffic class, one in the transmit direction and one in the receive direction.

20. The network interface card according to claim 17, wherein said cell formatter/deformatter means further comprises:
a parallel to serial converter, connected to said memory, a first multiplexer and a CRC, for converting data read from the memory into serial data suitable for transmission over the wireless asynchronous transfer mode communication network, wherein
the CRC is connected to said parallel to serial converter, said first multiplexer, a second multiplexer and said MODEM/radio for generating and detecting errors in cells transmitted and received from the wireless asynchronous transfer mode communications network;

the first multiplexer is connected to the CRC, the parallel to serial converter and the MODEM/radio, for multiplexing data output from the CRC with data output from the parallel to serial converter for subsequent presentation to the MODEM/radio;

the second multiplexer is connected to the MODEM/radio and the CRC for multiplexing data received from the MODEM/radio with an output of the CRC;

a serial to parallel converter connected to the second mulitplexer and the memory for converting serial data received and multiplexed by the second mulitplexer into parallel data for presentation to the memory.

21. The network interface card according to claim 20 further comprising:

a transmission table having a plurality of entries, each one of which represents a corresponding slot in a TDMA frame.

22. The network interface card according to claim 21 further comprising:

a data link control (DLC) included within the memory, the memory pointer processor and the controller for constructing/deconstructing frames for a transmitted/received bit stream.

23. A network interface card for providing an interface between a host and a wireless asynchronous transfer mode based communications network, which comprises:

a local bus for interconnecting components on the card;

a bus interface, connected to the local bus and a system bus contained within the host, for interconnecting the local bus to a system bus contained within the host;

a controller, connected to the local bus, for controlling local operations on the network interface card;

a randomly-accessible memory, connected to the local bus, for storage of working program and data;

a read-only memory, connected to the local bus, for storage of program code and data necessary for operating the controller;

a dual-ported memory; connected to the local bus and the bus interface, for providing communication between the network interface card and the host, said dual-ported memory being partitioned into a plurality of different regions wherein each region stores a particular type of data;

a WATM/AAL co-processor, connected to the dual-ported memory and the local bus, for formatting cells into different AAL, ATM and WATM transport protocols;

a cell pool ram, connected to the WATM/AAL co-processor, and the pointer processor, for buffering cells to be transmitted or received by the network interface card;

a TDMA framer, connected to the WATM/AAL co-processor, the local bus, and the cell pool ram, for synchronizing and delineating frames received by the network interface card;

a memory pointer processor, connected to the WATM/AAL co-processor, the local bus, and the dual-ported memory, for generating address locations indicating where data is to be stored or retrieved by the WATM/AAL co-processor and the TDMA framer;

a MODEM/radio, connected to the local bus and the TDM/ADD framer, for modulating and demodulating cells to be transmitted and received from the wireless asynchronous transfer mode communications network; and an antenna, connected to said MODEM/radio, for sending and receiving cells over said wireless asynchronous transfer mode communications network.

24. The network interface card according to claim 23 wherein said dual-ported memory further comprises:

a message region, which stores control messages exchanged between the host and the controller and the wireless asynchronous transfer mode communications network and the controller;

a control region;

an ABR region;

a VBR region; and a CBR region wherein each one of the ABR, VBR and CBR regions implements a first-in-first-out methodology to buffer cells transmitted or received from the wireless asynchronous transfer mode communications network.

25. The network interface card according to claim 24 wherein said dual-ported memory further comprises:

a pair of first-in first out structures for each one of the ABR, VBR and CBR regions respectively wherein each pair of first-in first out structures includes a transmit first-in first out structure and a receive first-in first out structure.

26. The network interface card according to claim 25 wherein said control region of the dual ported memory further comprises:

an offset parameter which indicates a start address of a first-in first out structure;

a length parameter which indicates a length of the first-in first out structure addressed by the offset parameter;

a write pointer which indicates a distance value from the offset address where data is to be stored in the first-in first out structure; and a read pointer which indicates a distance value from the offset address where data is to be read in the first-in first out structure.

27. The network interface card according to claim 23 wherein said WATM/AAL co-processor further comprises:

an instruction controller for controlling the WATM/AAL co-processor;

a program ram, connected to the instruction controller which contains a set of instructions that when operated on by the instruction controller, implement AAL, ATM and WATM transport protocols;

a set of pipeline stages, connected to the dual-ported memory, the randomly accessible memory, a set of registers and the instruction controller, that formats AAL, ATM and WATM cells; and the set of registers which contain protocol overhead data inserted by the controller.

28. The network interface card according to claim 27 wherein said set of pipeline stages comprises:

a first multiplexer stage, connected to the dual-ported memory, the set of registers and the instruction controller for multiplexing the overhead data contained in the set of registers with data contained in the dual-ported memory;

an ALU stage, connected to the first multiplexer stage and the instruction controller, that operates on a sequence number contained within the multiplexed data;

a shuffle stage, connected to the ALU stage and the instruction controller, which performs bit shifting on the multiplexed data;

a CRC stage, connected to the shuffle stage and the instruction controller, that generates a CRC for the multiplexed data;

a second mulitplexer stage, connected to the CRC stage and the instruction controller, that multiplexes the generated CRC with the multiplexed data thereby generating second multiplexed data;

a CRC-16 stage, connected to the second multiplexer stage and the instruction controller, for generating a CRC-16 of the second multiplexed data;

a third multiplexer stage, connected to the CRC-16 stage, the cell pool ram and the instruction controller, that multiplexes the second multiplexed data with the generated CRC-16.

29. The network interface card according to claim 28, wherein said pointer processor further comprises:

a PP-I section which controls the reading and writing of data to and from the dual-ported memory; and a PP-II section, which generates memory address locations of the cell pool ram.

30. The network interface card according to claim 25, wherein each one of said regions is further sub-divided into a set of sub-regions, such that each one of said sub-regions is associated with a particular connection.

* * * * *